(12) United States Patent
Takeshita

(10) Patent No.: US 11,740,865 B2
(45) Date of Patent: Aug. 29, 2023

(54) AGENT COORDINATION DEVICE, AGENT COORDINATION METHOD AND RECORDING MEDIUM

(71) Applicant: TOYOTA JIDOSHA KABUSHIKI KAISHA, Toyota (JP)

(72) Inventor: Kohki Takeshita, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 17/213,959

(22) Filed: Mar. 26, 2021

(65) Prior Publication Data

US 2021/0357179 A1 Nov. 18, 2021

(30) Foreign Application Priority Data

May 18, 2020 (JP) ................. 2020-086957

(51) Int. Cl.
*G06F 3/16* (2006.01)
*G10L 15/22* (2006.01)
*B60K 37/00* (2006.01)

(52) U.S. Cl.
CPC .............. *G06F 3/167* (2013.01); *B60K 37/00* (2013.01); *G06F 3/165* (2013.01); *G10L 15/22* (2013.01); *B60K 2370/164* (2019.05)

(58) Field of Classification Search
CPC ......... G06F 3/167; G06F 3/165; B60K 37/00; B60K 2370/164; G10L 15/22
See application file for complete search history.

(56) References Cited

U.S. PATENT DOCUMENTS

| 10,514,888 B1* | 12/2019 | Rodgers .................. G10L 25/78 |
| 2007/0203699 A1 | 8/2007 | Nagashima |
| 2014/0108929 A1* | 4/2014 | Garmark ................. G06F 3/165 |
| | | 715/716 |
| 2016/0098992 A1 | 4/2016 | Renard et al. |
| 2016/0322048 A1 | 11/2016 | Amano et al. |
| 2020/0105273 A1* | 4/2020 | O'Donovan ............ G10L 15/30 |

FOREIGN PATENT DOCUMENTS

| JP | 2003-58198 A | 2/2003 |
| JP | 2007-210462 A | 8/2007 |
| JP | 2007-226642 A | 9/2007 |
| JP | 2012-98100 A | 5/2012 |
| JP | 2017-535823 A | 11/2017 |
| JP | 2018-189984 A | 11/2018 |
| WO | 2019/172943 A1 | 9/2019 |

* cited by examiner

*Primary Examiner* — Fan S Tsang
*Assistant Examiner* — David Siegel
(74) *Attorney, Agent, or Firm* — Sughrue Mion, PLLC

(57) ABSTRACT

An agent coordination device that controls sound output according to an instruction from a plurality of agents that are capable of being instructed to perform a predetermined service by speech interaction; and controls so that, in a case in which a first agent among the plurality of agents is performing one of audiobook playback or music playback as the predetermined service while a second agent among the plurality of agents is performing another of audiobook playback or music playback as the predetermined service, audiobook playback is performed with a music playback volume reduced.

9 Claims, 6 Drawing Sheets

AGENT COORDINATION DEVICE, AGENT COORDINATION METHOD AND RECORDING MEDIUM

CROSS-REFERENCE TO RELATED APPLICATION

This application is based on and claims priority under 35 USC 119 from Japanese Patent Application No. 2020-086957 filed on May 18, 2020, the disclosure of which is incorporated by reference herein.

BACKGROUND

Technical Field

The present disclosure relates to an agent coordination device, an agent coordination method and a recording medium enabling utilization of services provided by plural agents.

Related Art

Japanese Patent Application Laid-Open (JP-A) No. 2018-189984 discloses a voice interaction method for utilizing services provided by two agents, in which agent information such as a keyword identifying an agent is used to decide which of the two agents will respond. More specifically, a voice interaction agent configuring a home agent receives an input voice signal and performs speech recognition processing on the input voice signal to obtain a speech recognition processing result. Based on the speech recognition processing result and the agent information, a decision is made as to whether processing based on the input voice signal is to be undertaken by either the home agent or an alternative vehicle agent. In this decision making, in cases in which a decision is made that the home agent will respond, processing is performed based on the speech recognition processing result and a response speech signal is generated and output according to this processing. In cases in which a decision is made that the vehicle agent will respond, the input voice signal is forwarded to a vehicle agent server.

Although JP-A No. 2018-189984 enables the services of plural agents to be utilized, there is room for improvement from the perspective of convenient simultaneous utilization of the services of plural agents.

SUMMARY

An aspect of the present disclosure is an agent coordination device that includes: a memory; and a processor, the processor being connected to the memory and being configured to: control sound output according to an instruction from a plurality of agents that are capable of being instructed to perform a predetermined service by speech interaction; and control so that, in a case in which a first agent among the plurality of agents is performing one of audiobook playback or music playback as the predetermined service while a second agent among the plurality of agents is performing another of audiobook playback or music playback as the predetermined service, audiobook playback is performed with a music playback volume reduced.

DESCRIPTION OF EMBODIMENTS

Figure 1:
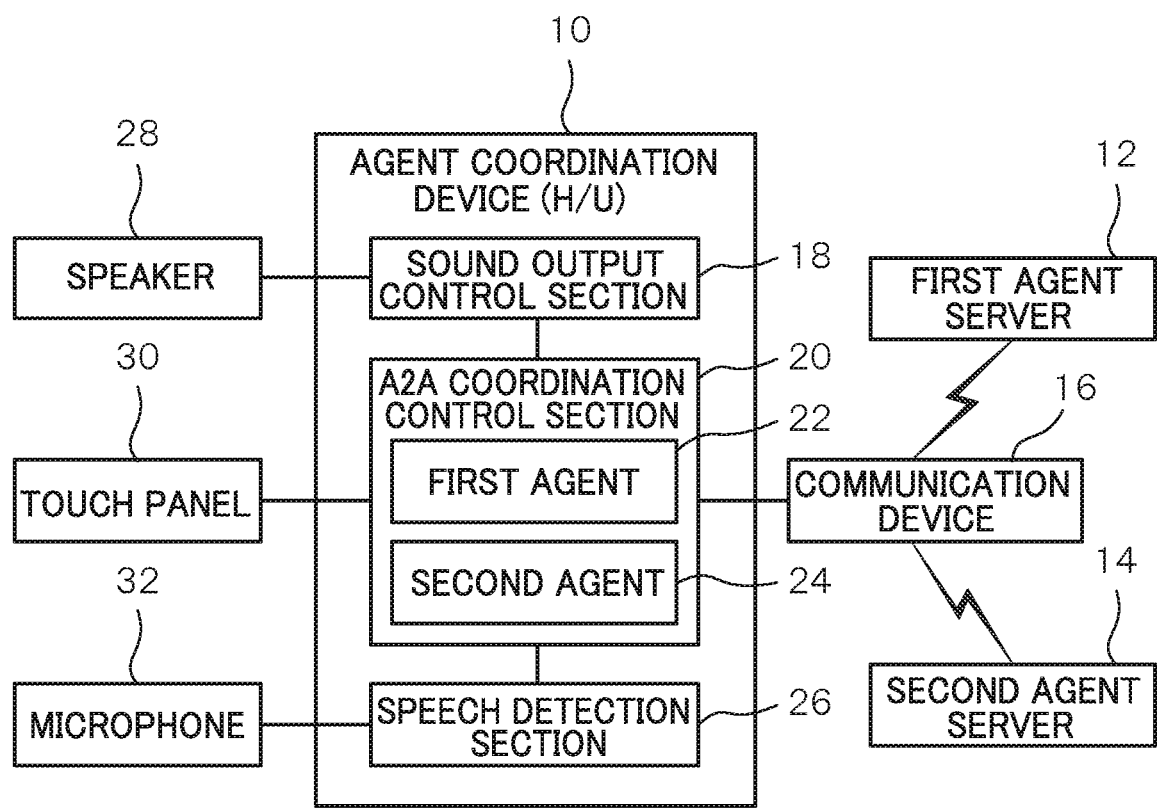
FIG. 1 is a block diagram schematically illustrating an example of configuration of an agent coordination device according to an exemplary embodiment.

Detailed explanation follows regarding an example of an exemplary embodiment of the present invention, with reference to the drawings. FIG. 1 is a block diagram schematically illustrating configuration of an agent coordination device according to the present exemplary embodiment.

As an example, an agent coordination device 10 according to the present exemplary embodiment is installed to a head unit (H/U) mounted as an in-vehicle unit.

The agent coordination device 10 is connected to plural agent servers through a communication device 16. In the present exemplary embodiment, as an example, the agent coordination device 10 is connected to two agent servers, namely a first agent server 12 and a second agent server 14. The agent coordination device 10 communicates with the two agent servers in order to provide a user with services provided by the respective agent servers. The agent coordination device 10 also includes functionality to control sound output from each of the agent servers.

Both the first agent server 12 and the second agent server 14 are what are referred to as virtual personal assistants (VPA) that provide audio interaction assistance functionality. More specifically, audio interaction is used to provide the user with predetermined services such as music playback, audiobook playback, and weather forecasts via the agent coordination device 10. Various known technology may be applied in the specific configuration thereof, and so explanation thereof is omitted.

The communication device 16 of the present exemplary embodiment is a dedicated vehicle communication unit that communicates between the agent coordination device 10 and the first agent server 12, and also communicates between the agent coordination device 10 and the second agent server 14. For example, this communication is performed over a wireless communication network such as a mobile telephone network. As an example, a communication device referred to as a data communication module (DCM) is applied therefor.

Figure 6:
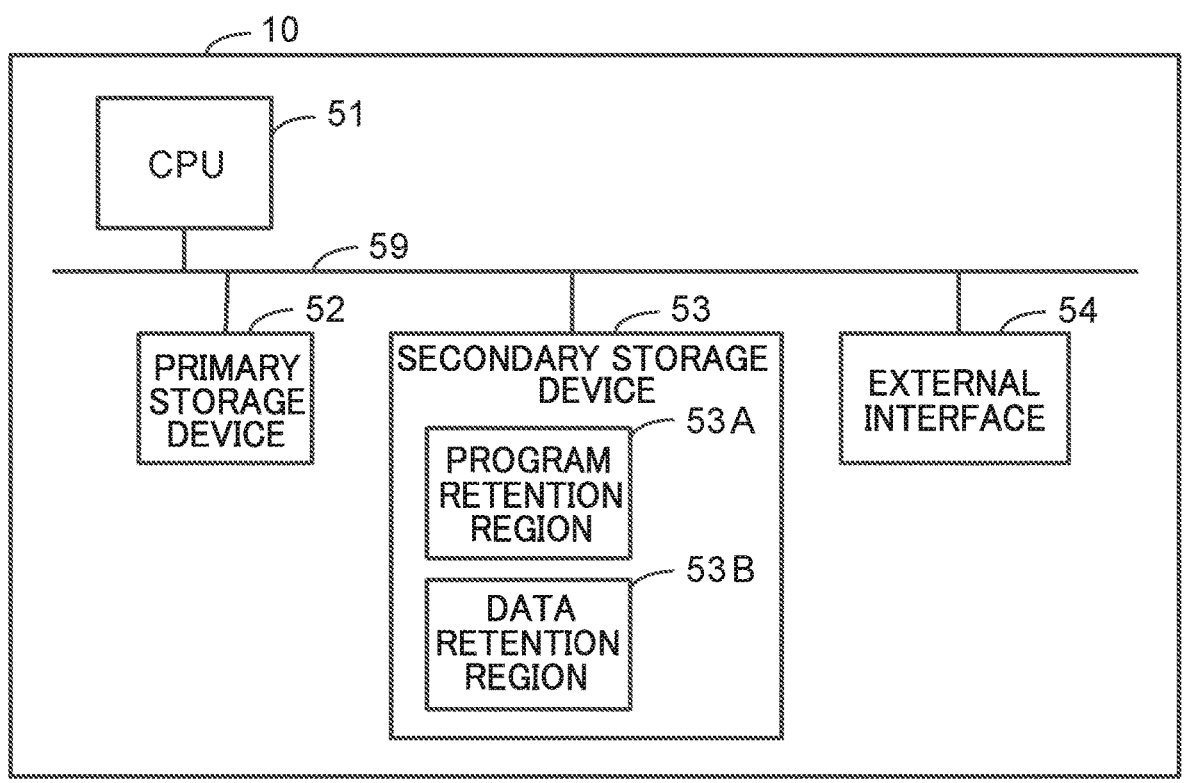
FIG. 6 is a block diagram schematically illustrating an example of hardware configuration of an agent coordination device according to an exemplary embodiment.

FIG. 6 illustrates an example of hardware configuration of the agent coordination device 10. As illustrated in FIG. 6, as an example, the agent coordination device 10 includes a central processing unit (CPU) 51, a primary storage device 52, a secondary storage device 53, and an external interface 54.

The CPU 51 is an example of a processor configured by hardware. The CPU 51, the primary storage device 52, the secondary storage device 53, and the external interface 54 are connected together through a bus 59. The CPU 51 may be configured by a single processor, or may be configured by plural processors. Alternatively, a graphics processing unit (GPU) may be employed instead of the CPU 51.

The primary storage device 52 is, for example, configured by volatile memory such as random access memory (RAM). The secondary storage device 53 is, for example, configured by non-volatile memory such as a hard disk drive (HDD) or a solid state drive (SSD).

The secondary storage device 53 includes a program retention region 53A and a data retention region 53B. As an example, the program retention region 53A retains programs such as an agent coordination program. The data retention region 53B may function as a temporary storage device that temporarily retains intermediate data generated during execution of the agent coordination program.

The CPU 51 reads the agent coordination program from the program retention region 53A and expands the agent coordination program in the primary storage device 52. The CPU 51 loads and executes the agent coordination program in order to function as a sound output control section 18, this being an example of a sound output section, an agent-to-agent (A2A) coordination control section 20, this being an example of a control section, and an speech detection section 26.

External devices are connected to the external interface 54, and the external interface 54 oversees the transfer of various information between the external devices and the CPU 51. For example, a speaker 28, a touch panel 30, a microphone 32, and the communication device 16 are connected to the external interface 54. Any or all out of the speaker 28, the touch panel 30, the microphone 32, and the communication device 16 may be provided internally to the agent coordination device 10.

The sound output control section 18 is connected to the speaker 28, and controls sound output from the first agent server 12 and the second agent server 14.

The A2A coordination control section 20 is connected to the touch panel 30, the sound output control section 18, and the speech detection section 26, and exchanges information therebetween. The A2A coordination control section 20 includes the functionality of a first agent 22 and a second agent 24. The first agent 22 is provided corresponding to the first agent server 12, and controls interaction with the first agent server 12. The second agent 24 is provided corresponding to the second agent server 14, and controls interaction with the second agent server 14. The A2A coordination control section 20 notifies the sound output control section 18 in cases in which information relating to audio interaction has been received from the respective agent servers. The sound output control section 18 thus controls sound output from the speaker 28 based on the information relating to audio interaction.

The speech detection section 26 is connected to the microphone 32, and thereby detects speech information obtained through the microphone 32 and notifies the A2A coordination control section 20 of its detection results. For example, the speech detection section 26 detects a wake-up word used to start up the respective agents.

Next, explanation follows regarding a specific example of operation performed by the respective sections of the agent coordination device 10 according to the present exemplary embodiment configured as described above.

In the agent coordination device 10 according to the present exemplary embodiment, the speech detection section 26 detects a wake-up word and notifies the A2A coordination control section 20, and the A2A coordination control section 20 connects to the corresponding agent server through the communication device 16.

The sound output control section 18 controls output of sound from the speaker 28 in response to a request for sound output (for example audio interaction, music, or an audiobook) from the respective agent servers.

The A2A coordination control section 20 controls the sound output control section 18 such that, in cases in which one out of the first agent 22 or the second agent 24 is to perform one out of audiobook playback or music playback while the other out of the first agent 22 or the second agent 24 is in the process of performing the other out of audiobook playback or music playback, such that audiobook playback is performed with the volume of the music playback lower than an original volume. The original volume may be a predetermined volume or a volume set by the user that is an appropriate listening volume. The audiobook may be played at a predetermined volume or a volume set by the user that is an appropriate listening volume.

Next, detailed explanation follows regarding processing performed by the respective sections of the agent coordination device 10 according to the present exemplary embodiment.

Figure 2:
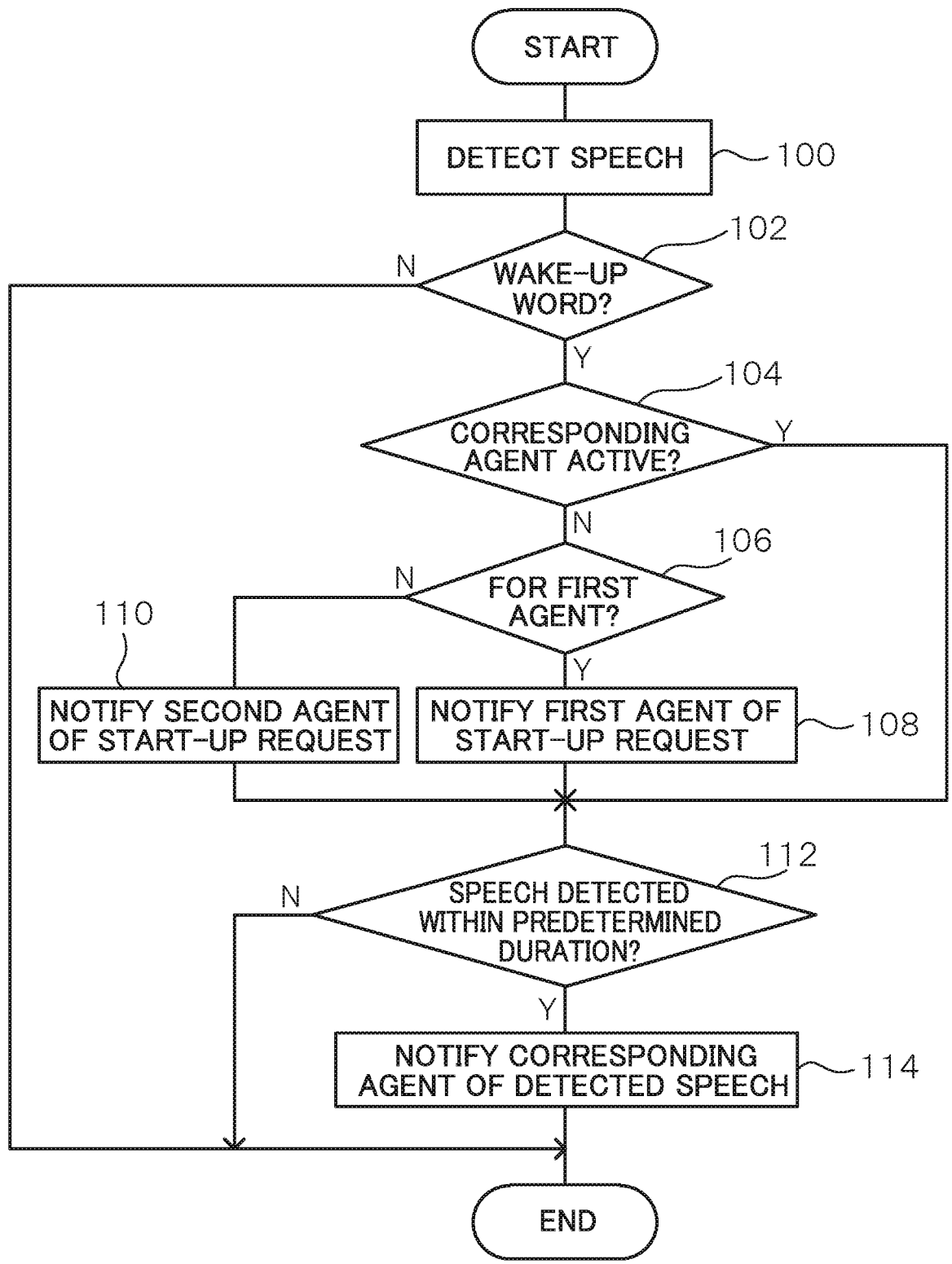
FIG. 2 is a flowchart illustrating an example of a flow of processing performed by a voice detection section of an agent coordination device according to an exemplary embodiment.

First, explanation follows regarding processing performed by the speech detection section 26. FIG. 2 is a flowchart illustrating an example of a flow of processing performed by the speech detection section 26 of the agent coordination device 10 according to the present exemplary embodiment. Note that the processing in FIG. 2 is, for example, started on receipt of speech input to the speech detection section 26 through the microphone 32.

At step 100, the speech detection section 26 performs speech detection, and then processing transitions to step 102. Namely, the speech input through the microphone 32 is detected.

At step 102, the speech detection section 26 determines whether or not a wake-up word has been detected. This determination is determination as to whether or not a predetermined wake-up word used to start up the first agent 22 or a predetermined wake-up word used to start up the second agent 24 has been detected. In cases in which determination is affirmative, processing transitions to step 104, and in cases in which determination is negative, the processing routine is ended.

At step 104, the speech detection section 26 determines whether or not the agent corresponding to the wake-up word is active. In cases in which determination is negative, processing transitions to step 106, and in cases in which determination is affirmative, processing transitions to step 112.

At step 106, the speech detection section 26 determines whether or not the detected wake-up word is for the first agent. In cases in which determination is affirmative, processing transitions to step 108, and in cases in which a wake-up word for the second agent is detected, namely in cases in which the determination at step 106 is negative, processing transitions to step 110.

At step 108, the speech detection section 26 notifies the first agent 22 of a start-up request, and processing transitions to step 112.

On the other hand, at step 110, the speech detection section 26 notifies the second agent 24 of a start-up request, and processing transitions to step 112.

At step 112, the speech detection section 26 determines whether or not speech has been detected within a predetermined duration. In cases in which determination is negative, namely in cases in which speech has not been detected within the predetermined duration, the processing routine is ended, and in cases in which determination is affirmative, processing transitions to step 114.

At step 114, the speech detection section 26 notifies the corresponding agent of the detected speech, and then the processing routine is ended. Namely, in cases in which speech has been detected within the predetermined duration after detecting the wake-up word of the first agent 22, the first agent 22 is notified of the detected speech. On the other hand, in cases in which speech has been detected within the predetermined duration after detecting the wake-up word of the second agent 24, the second agent 24 is notified of the detected speech.

Figure 3:
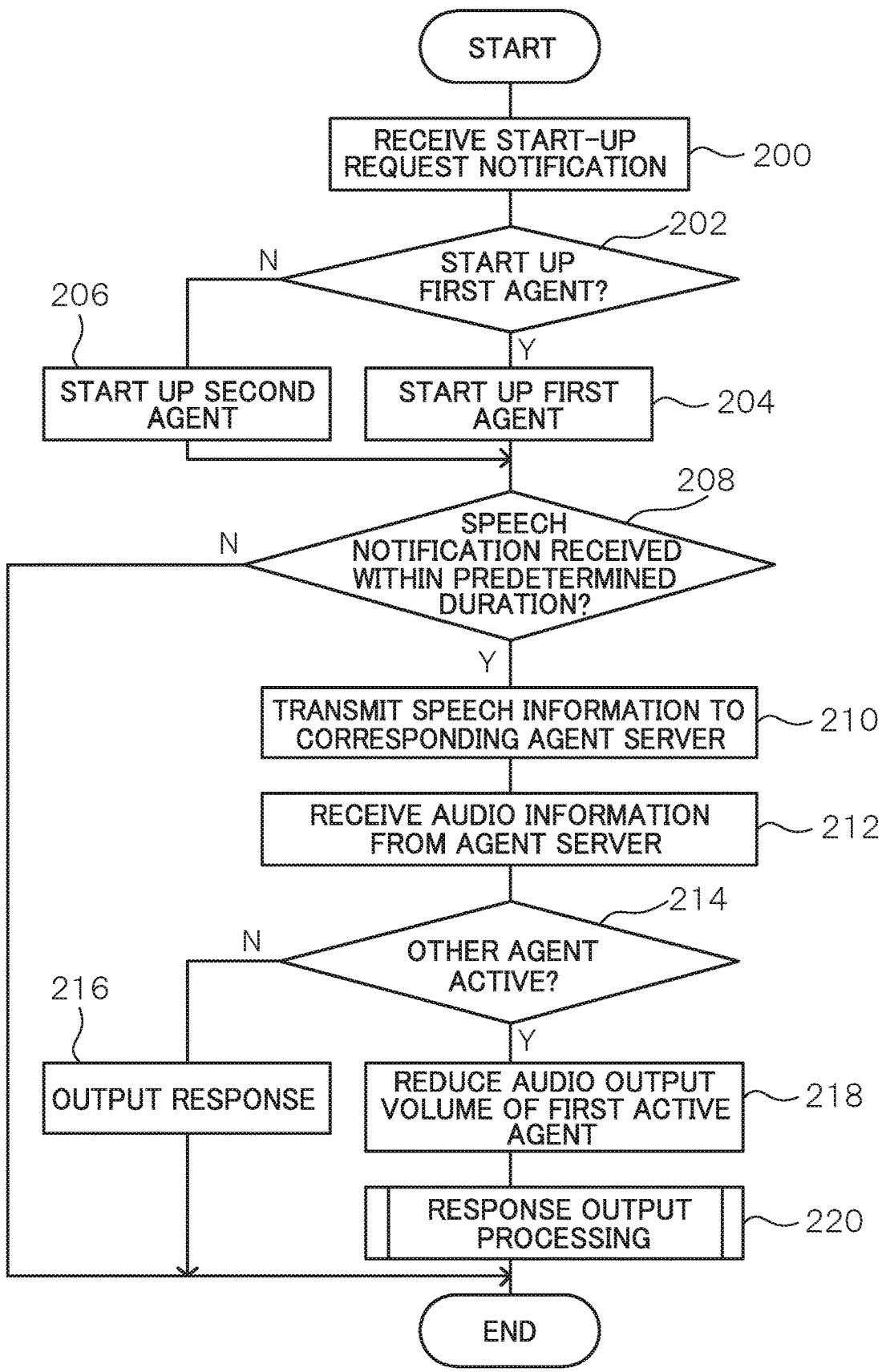
FIG. 3 is a flowchart illustrating a detailed example of a flow of processing performed by an agent-to-agent (A2A) coordination control section of an agent coordination device according to an exemplary embodiment.

Next, explanation follows regarding processing performed by the A2A coordination control section 20. FIG. 3 is a flowchart illustrating a detailed example of a flow of processing performed by the A2A coordination control section 20 of the agent coordination device 10 according to the present exemplary embodiment. Note that the processing in FIG. 3 is started on receipt of agent wake-up notification from the speech detection section 26.

At step 200, the A2A coordination control section 20 receives an agent start-up request notification, and processing transitions to step 202. Namely, the agent start-up request notification is received as a result of the processing at step 108 or step 110 in FIG. 2.

At step 202, the A2A coordination control section 20 determines whether or not the agent start-up request notification received from the speech detection section 26 is a start-up request notification for the first agent 22. In cases in which determination is affirmative, processing transitions to step 204, and in cases in which determination is negative, processing transitions to step 206.

At step 204, the first agent 22 is started up and processing transitions to step 208. More specifically, communication between the first agent 22 and the first agent server 12 is established, and a transition is made to a state in which a service can be provided by the first agent server 12.

On the other hand, at step 206, the second agent 24 is started up and processing transitions to step 208. More specifically, communication between the second agent 24 and the second agent server 14 is established, and a transition is made to a state in which a service can be provided by the second agent server 14.

At step 208, the A2A coordination control section 20 determines whether or not speech notification has been received from the speech detection section 26 within a predetermined duration. This determination corresponds to determination as to whether or not speech notification has been received based on step 114 described above. In cases in which determination is affirmative, processing transitions to step 210, and in cases in which determination is negative, the processing routine is ended.

At step 210, the A2A coordination control section 20 transmits speech information from the corresponding agent to the corresponding agent server, and processing transitions to step 212. Namely, in cases in which the first agent 22 has been started up and has received the speech notification, the first agent 22 transmits the speech information to the first agent server 12. On the other hand, in cases in which the second agent 24 has been started up and has received the speech notification, the second agent 24 transmits the speech information to the second agent server 14.

At step 212, the A2A coordination control section 20 receives audio information from the agent server, and processing transitions to step 214. For example, in cases in which speech information with content relating to audiobook or music playback has been transmitted to the agent server at step 210, the agent server interprets an intent based on the speech information, and the A2A coordination control section 20 receives corresponding audio information relating to audiobook or music playback.

At step 214, the A2A coordination control section 20 determines whether or not the other agent is active. This determination corresponds to determination as to whether or not the other out of the first agent 22 or the second agent 24 is active in cases in which the speech information has been received by the one out of the first agent 22 or the second agent 24. In cases in which determination is negative, processing transitions to step 216, and in cases in which determination is affirmative, processing transitions to step 218.

At step 216, the A2A coordination control section 20 outputs a response from the agent server and the processing routine is ended. Namely, the A2A coordination control section 20 controls the sound output control section 18 so as to output response audio, audiobook audio, or music audio received from the agent server through the speaker 28.

On the other hand, at step 218, the A2A coordination control section 20 lowers the sound output volume of the agent that was active first, and then processing transitions to step 220. Namely, the A2A coordination control section 20 instructs the sound output control section 18 to lower the volume of the sound output (for example an audiobook or music) of the agent that was active first. The volume of a sound source that was already being output is thus lowered such the audibility of the interaction with the agent is improved. Note that the sound output may be paused at step 218 instead of lowering the volume while the interaction is in progress.

Figure 4:
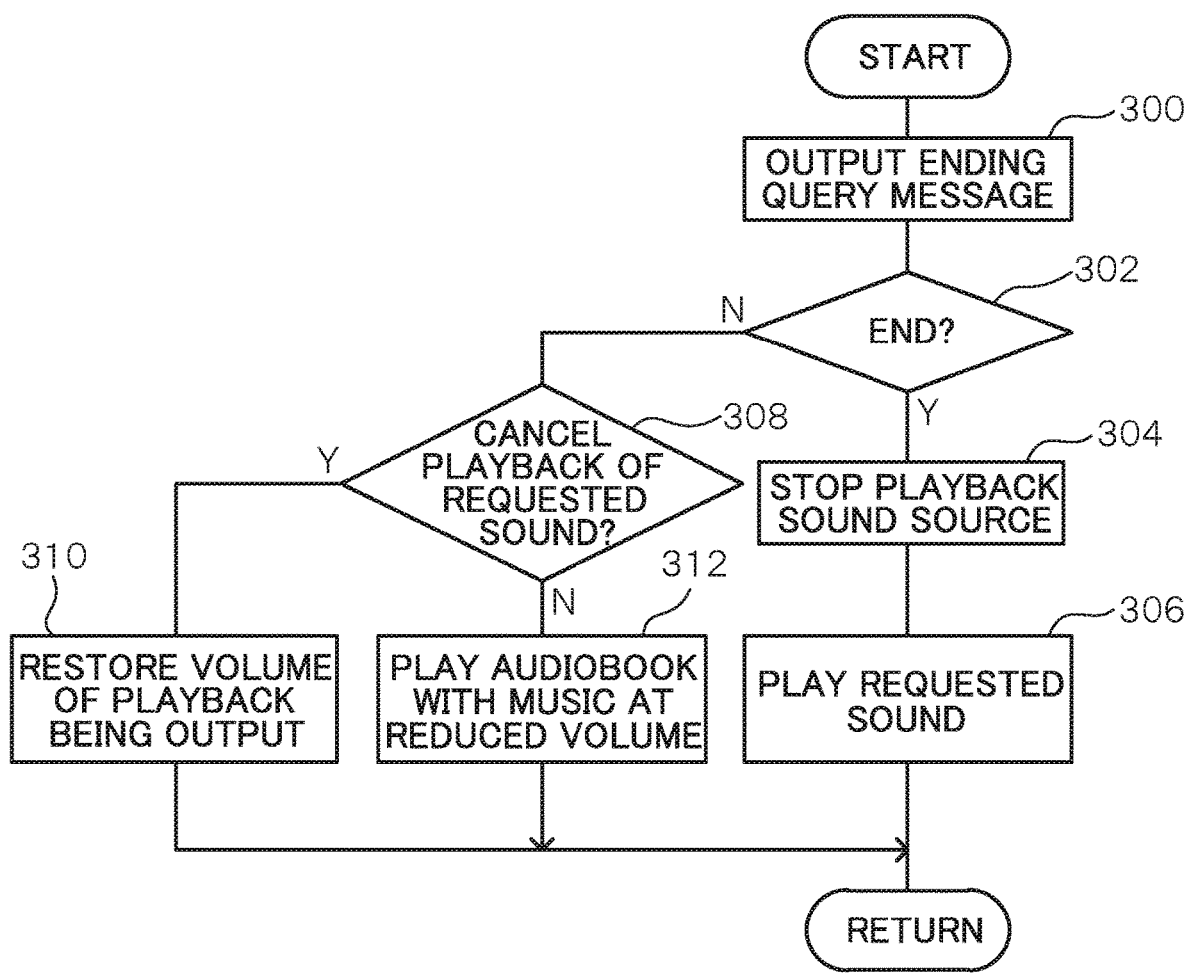
FIG. 4 is a flowchart illustrating an example of a flow of response output processing.

At step 220, the A2A coordination control section 20 performs response output processing and the processing routine is ended. The response output processing is processing to respond to the interaction by the user, and an example of such processing is illustrated in FIG. 4. FIG. 4 is a flowchart illustrating an example of the response output processing. Note that in the present exemplary embodiment, an explanation is given of an example in which one of the agents is in the process of playing one out of an audiobook or music and a request to play the other out of an audiobook or music is made to the other agent, or such a request is made but this request is but then cancelled mid-processing.

Namely, at step 300, the A2A coordination control section 20 outputs a message asking whether or not to end sound output (audiobook or music playback) by the agent that was active first, and then processing transitions to step 302. For example, the A2A coordination control section 20 may control the sound output control section 18 to output an audio message asking whether or not to end the lowered volume sound output by the agent that was active first. Alternatively, the A2A coordination control section 20 may display a message asking whether or not to end the lowered volume sound output by the agent that was active first on the touch panel 30.

At step 302, the A2A coordination control section 20 determines whether or not to end the lowered volume sound output by the agent that was active first. For example, as this determination, the A2A coordination control section 20 may acquire a speech detection result from the speech detection section 26 and determine whether or not any speech expressing ending is detected in this interaction. Alternatively, the A2A coordination control section 20 may determine whether or not an operation expressing ending has been input using the touch panel 30. In cases in which determination is affirmative, processing transitions to step 304, and in cases in which determination is negative, processing transitions to step 308.

At step 304, the A2A coordination control section 20 stops the sound source that is in the process of being played, and processing transitions to step 306. For example, in cases in which an audiobook or music is being played, playback of this audiobook or music is stopped and processing transitions to step 306.

At step 306, the A2A coordination control section 20 acquires and plays the sound requested of the agent that was started up later from the corresponding agent server, and plays this sound. The processing in FIG. 4 then returns, thereby ending the processing routine.

On the other hand, at step 308, the A2A coordination control section 20 determines whether or not to cancel the sound playback requested of the agent that was started up later. Similarly to step 302 for example, this determination is determination as to whether or not to cancel the requested playback by speech interaction with the user or by operation of the touch panel 30 by the user. In cases in which determination is affirmative, processing transitions to step 310, and in cases in which determination is negative, processing transitions to step 312.

At step 310, the A2A coordination control section 20 controls the sound output control section 18 to restore the state prior to lowering the volume of the playback being output, and the processing in FIG. 4 returns, thereby ending the processing routine.

On the other hand, at step 312, the A2A coordination control section 20 controls the sound output control section 18 to play the audiobook with the music volume remaining lowered. The processing in FIG. 4 then returns, thereby ending the processing routine.

Figure 5:
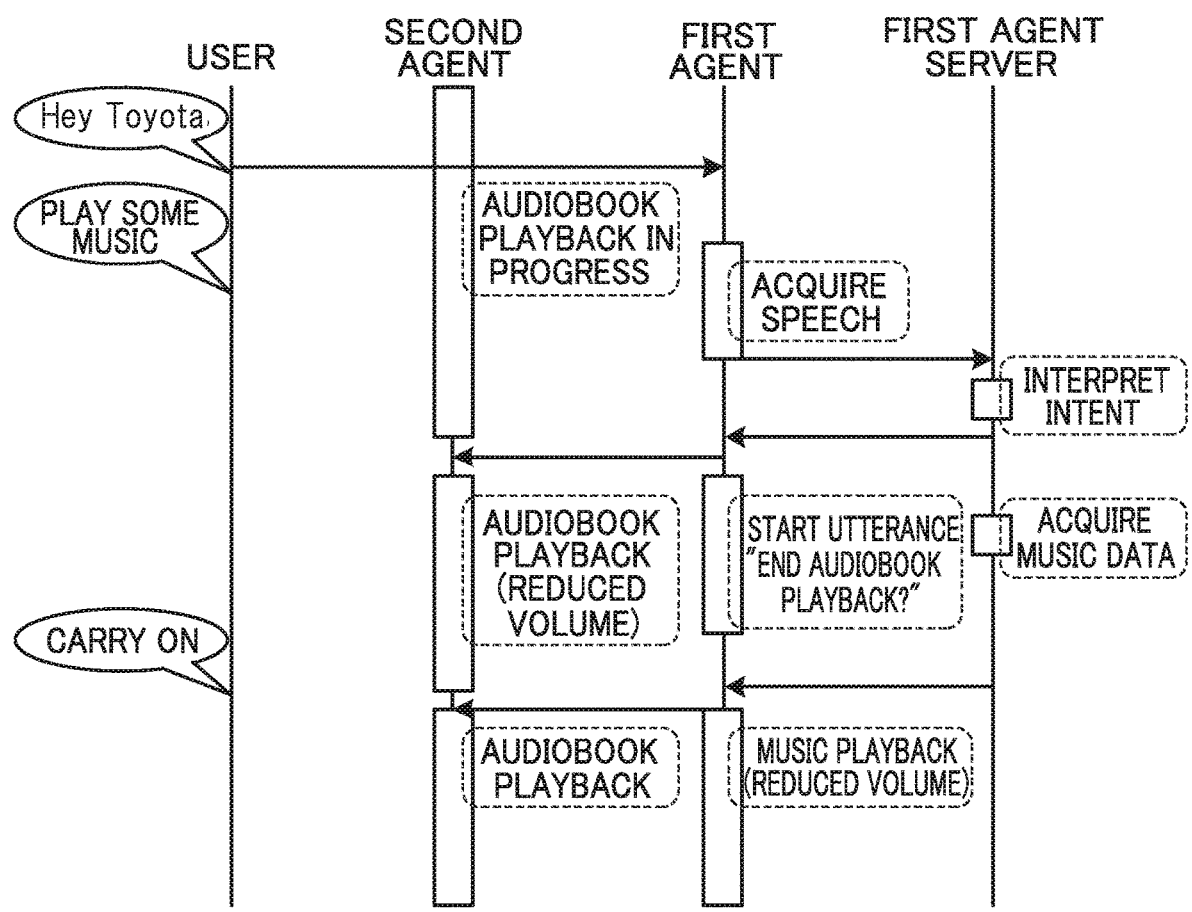
FIG. 5 is a sequence diagram illustrating a case in which a first agent is instructed to perform music playback while audiobook playback is in the process of being performed by a second agent.

Explanation follows regarding an example of the response output processing in FIG. 4. FIG. 5 is a sequence diagram illustrating a case in which the first agent 22 is instructed to play music while the second agent 24 is in the process of playing an audiobook.

As illustrated in FIG. 5, as the second agent 24 is playing an audiobook, the user utters the phrase "Hey Toyota", this being an example of a wake-up word of the first agent 22. The speech detection section 26 therefore detects speech at step 100 described above, affirmative determination is made at step 102 and negative determination is made at step 104. Affirmative determination is then made at step 106 and the first agent 22 is notified of a start-up request at step 108. When the first agent 22 is notified of the start-up request, the A2A coordination control section 20 receives the start-up request notification at step 200 described above. Affirmative determination is made at step 202 and the first agent 22 is started up at step 204.

If the utterance "Play some music" is made within the predetermined duration following the wake-up word, the speech detection section 26 makes affirmative determination at step 112, and notifies the first agent 22 of the speech at step 114. When this speech is notified, the A2A coordination control section 20 makes affirmative determination at step 208 described above, and the uttered speech is transmitted to the first agent server 12 at step 210. The first agent server 12 then interprets the intent, and the first agent 22 of the A2A coordination control section 20 receives a response at step 212. Note that since the second agent 24, this being the other agent, is active, affirmative determination is made at step 214, the audiobook playback volume for the second agent 24 is lowered at step 218, and response output processing is performed at step 220.

In the response output processing, at step 300 described above the first agent 22 outputs a message such as "End audiobook playback?" as an ending query. Note that in the example in FIG. 5, if the user makes an utterance such as "Carry on", determination is negative at step 302 and step 308, and the second agent 24 plays the audiobook while the first agent 22 plays music at the lowered volume at step 312.

In this manner, in the agent coordination device 10 according to the present exemplary embodiment, in cases in which one agent out of the two agents is to perform one out of audiobook playback or music playback while the other agent is in the process of performing the other out of audiobook playback or music playback, the audiobook is played with the music playback volume lowered with respect to the original volume. The original volume may be a predetermined volume or a volume set by the user and is an appropriate listening volume. The audiobook may be played at a predetermined volume or a volume set by the user and is an appropriate listening volume. This enables convenient simultaneous utilization of services provided by plural agent servers. Namely, the user is able to automatically obtain a user experience of listening to music as background music while also listening to an audiobook at an intelligible volume.

Note that although explanation has been given regarding an example in which two agents, namely the first agent 22 and the second agent 24, are present in the exemplary embodiment described above, there is no limitation thereto, and three or more of the plural agents may be present. In such cases, it is sufficient for the A2A coordination control section 20 to be able to control a sound output control section such that in cases in which one agent out of the plural agents is to perform one out of audiobook playback or music playback while another agent out of the plural agents is in the process of performing the other out of audiobook playback or music playback, the audiobook is played with the music playback volume lowered.

Although explanation has been given regarding an example in which the processing performed by the agent coordination device 10 is software processing performed by executing a program in the exemplary embodiment described above, there is no limitation thereto. For example, hardware processing may be performed using an application specific integrated circuit (ASIC) or a field-programmable gate array (FPGA). Alternatively, processing may be performed by a combination of both software and hardware. Alternatively, in cases in which in which software processing is performed, the program may be distributed stored on various storage media.

The present disclosure is not limited to the above explanation, and various other modifications may be implemented within a range not departing from the spirit of the present disclosure.

An object of the present disclosure is to provide an agent coordination device, an agent coordination method and a recording medium enabling convenient simultaneous utilization of services provided by plural agents.

An first aspect of the present disclosure is an agent coordination device that includes: a memory; and a processor, the processor being connected to the memory and being configured to: control sound output according to an instruction from a plurality of agents that are capable of being instructed to perform a predetermined service by speech interaction; and control so that, in a case in which a first agent among the plurality of agents is performing one of audiobook playback or music playback as the predetermined service while a second agent among the plurality of agents is performing another of audiobook playback or music playback as the predetermined service, audiobook playback is performed with a music playback volume reduced.

In the first aspect, sound output is controlled according to an instruction from plural agents capable of being instructed to perform a predetermined service by speech interaction.

Control is performed such that, in a case in which one agent out of the plural agents is to perform one playback out of audiobook playback or music playback as the service while another agent out of the plural agents is in the process of performing the other playback out of audiobook playback or music playback as the service, the audiobook playback is performed with the music playback volume lowered. This enables the audiobook to be played with the music as background music, thereby enabling convenient simultaneous utilization of the services provided by the plural agents.

The second aspect of the present disclosure is the agent coordination device of the first aspect, wherein the processor is further configured to control to reduce or stop sound of playback that is being performed by the second agent, in a case in which speech interaction with a third agent is performed and response audio is output while the second agent is performing the another playback of audiobook playback or music playback. This enables the audibility of the interaction with the agent to be improved when the audiobook or music is in the process of being played.

The third aspect of the present disclosure is the agent coordination device of the first or second aspect, wherein the processor is further configured to: confirm a user intention, and control so as to perform audiobook playback with music playback being performed at a reduced volume in a case in which audiobook continuation has been instructed. This enables the intention of the user to be reflected, such that music playback and audiobook playback can be performed simultaneously.

The fourth aspect of the present disclosure is the agent coordination device of any one of the first to third aspect, wherein the processor is further configured to: confirm a user intention; and control so as to stop audiobook playback and perform music playback in a case in which audiobook non-continuation has been instructed. This enables audiobook playback to be performed on its own in a case in which background music is not required.

The agent coordination device of the present disclosure can be provided in forms of an agent coordination method and/or a non-transitory computer-readable recording medium in which a program that is executable by a computer to perform an agent coordination processing is recorded.

The present disclosure is capable of providing an agent coordination device, an agent coordination method and a recording medium enabling convenient simultaneous utilization of the services provided by plural agents.

The invention claimed is:

1. An agent coordination device on a vehicle, comprising:
a memory; and
a processor, the processor being connected to the memory and being configured to:
control sound output according to an instruction from a plurality of agents that are capable of being instructed to perform a predetermined service by speech interaction;
control so that, in a case in which a first agent among the plurality of agents is performing an audiobook playback as the predetermined service when a second agent among the plurality of agents starts to perform a music playback as the predetermined service, the audiobook playback is performed at a reduced volume with the music playback;
confirm a user intention by outputting an inquiry to the user; and
continuously perform the audiobook playback at a volume before reducing with music playback being performed at a reduced volume in a case in which it is determined that audiobook continuation has been instructed based on the user intention that is indicated with an answer to the inquiry from the user by voice.

2. The agent coordination device of claim 1, wherein the processor is further configured to control to reduce or stop sound of playback that is being performed by the second agent, in a case in which speech interaction with a third agent is performed and response audio is output while the second agent is performing the music playback.

3. The agent coordination device of claim 1, wherein the processor is further configured to:
control so as to stop audiobook playback and perform music playback in a case in which audiobook non-continuation has been instructed by the user.

4. An agent coordination method comprising:
by a processor,
controlling sound output according to an instruction from a plurality of agents that are capable of being instructed to perform a predetermined service by speech interaction;
controlling so that, in a case in which a first agent among the plurality of agents is performing an audiobook playback as the predetermined service when a second agent among the plurality of agents starts to perform a music playback as the predetermined service, the audiobook playback is performed at a reduced volume with a music playback;
confirming a user intention by outputting an inquiry to the user; and
continuously performing the audiobook playback at a volume before reducing with music playback being performed at a reduced volume in a case in which it is determined that audiobook continuation has been instructed based on the user intention that is indicated with an answer to the inquiry from the user by voice.

5. The agent coordination method of claim 4 further comprising controlling to reduce or stop sound of playback that is being performed by the second agent, in a case in which speech interaction with a third agent is performed and response audio is output while the second agent is performing the music playback.

6. The agent coordination method of claim 4 further comprising:
controlling so as to stop audiobook playback and perform music playback in a case in which audiobook non-continuation has been instructed by the user.

7. A non-transitory computer-readable recording medium that records a program that is executable by a computer to perform an agent coordination processing, the agent coordination processing comprising:
controlling sound output according to an instruction from a plurality of agents that are capable of being instructed to perform a predetermined service by speech interaction;
controlling so that, in a case in which a first agent among the plurality of agents is performing an audiobook playback as the predetermined service when a second agent among the plurality of agents starts to perform a music playback as the predetermined service, the audiobook playback is performed at a reduced volume with a music playback;

confirming a user intention by outputting an inquiry to the user; and continuously performing the audiobook playback at a volume before reducing with music playback being performed at a reduced volume in a case in which it is determined that audiobook continuation has been instructed based on the user intention that is indicated with an answer to the inquiry from the user by voice.

8. The non-transitory computer-readable recording medium of claim 7, wherein the agent coordination processing further comprising controlling to reduce or stop sound of playback that is being performed by the second agent, in a case in which speech interaction with a third agent is performed and response audio is output while the second agent is performing the music playback.

9. The non-transitory computer-readable recording medium of claim 7, wherein the agent coordination processing further comprises:

controlling so as to stop audiobook playback and perform music playback in a case in which audiobook non-continuation has been instructed by the user.

\* \* \* \* \*